(12) United States Patent
Speth et al.

(10) Patent No.: US 6,241,301 B1
(45) Date of Patent: Jun. 5, 2001

(54) DEPLOYABLE FOOT REST FOR A MOTOR VEHICLE

(75) Inventors: Stephan J. Speth, Orchard Lake; Thomas B. Tran, Lake Orion, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/467,191

(22) Filed: Dec. 20, 1999

(51) Int. Cl.[7] .......................................... B60N 3/06
(52) U.S. Cl. ............................. 296/75; 180/90.6
(58) Field of Search ................. 296/75; 180/90.6

(56) References Cited

U.S. PATENT DOCUMENTS

| 826,862 | * | 7/1906 | Little ........................................ 296/75 |
| 1,487,495 | * | 3/1924 | Von Germeten et al. ............. 296/75 |
| 2,032,157 | * | 2/1936 | Van Dresser et al. ................. 296/75 |
| 2,202,857 | * | 6/1940 | Jacobs ...................................... 296/75 |
| 2,283,600 | * | 5/1942 | Dodson .................................... 296/75 |
| 3,059,960 | * | 10/1962 | Komorowski et al. ................. 296/75 |
| 3,784,247 | | 1/1974 | Mills ......................................... 296/75 |
| 4,955,658 | | 9/1990 | Graves ..................................... 296/75 |
| 5,183,308 | * | 2/1993 | Koga et al. ............................ 296/75 |
| 5,836,637 | | 11/1998 | Laginess et al. ....................... 296/75 |

FOREIGN PATENT DOCUMENTS

| 95260 | * | 7/1938 | (AU) ...................................... 296/75 |
| 461793 | * | 10/1913 | (FR) ...................................... 296/75 |
| 721760 | * | 12/1931 | (FR) ...................................... 296/75 |
| 115624 | * | 12/1957 | (FR) ...................................... 296/75 |
| 1138 | * | 6/1908 | (GB) ...................................... 296/75 |

* cited by examiner

Primary Examiner—Joseph D. Pape
(74) Attorney, Agent, or Firm—Larry Shurupoff

(57) ABSTRACT

A motor vehicle including an occupant compartment and a foot rest. The occupant compartment is partially defined by a floor. The foot rest is interconnected with the floor for movement between a first position and a second position. An upper surface of the foot rest is flush with the floor when the foot rest is in the second position. The upper surface extends above the floor when the foot rest is in the first position.

14 Claims, 3 Drawing Sheets

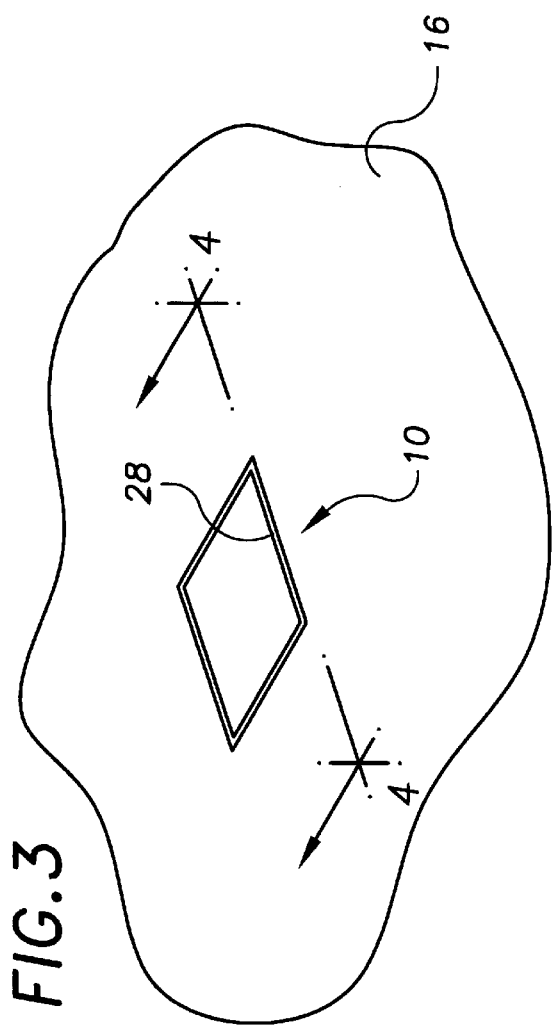
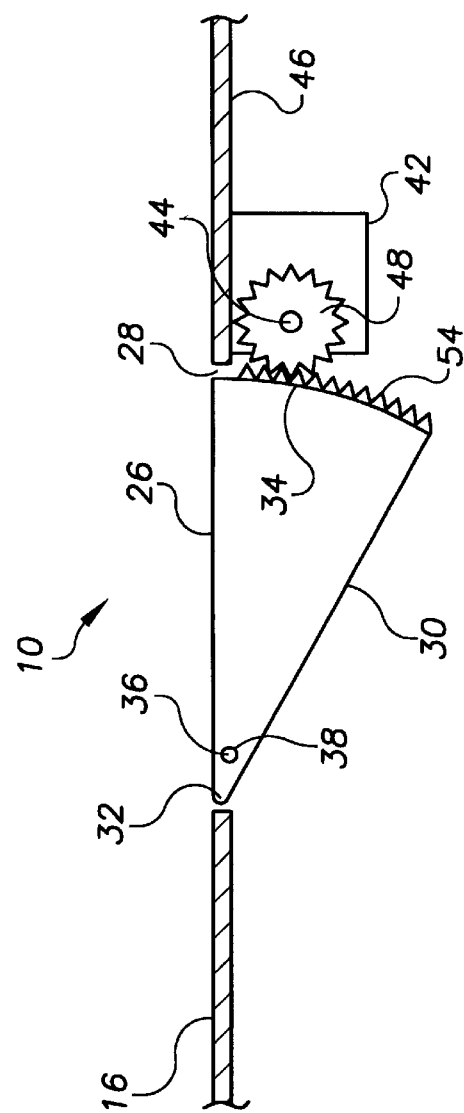
FIG.3
FIG.4

DEPLOYABLE FOOT REST FOR A MOTOR VEHICLE

BACKGROUND OF THE INVENTION

1. Technical Field

The present invention generally pertains to motor vehicles. More particular, the present invention pertains to a deployable foot rest for a motor vehicle.

2. Discussion

The front seats of motor vehicles are mounted on a passenger compartment floor. The floor provides a surface upon which passengers normally rest their feet. The passenger compartment floor is typically flat and connects to an angled toe board adjacent the fire wall. The flat compartment floor is often uncomfortable for foot support, particularly during longer trips. The angle of the toe board frequently provides a convenient surface upon which the passenger may rest his or her feet.

Since vehicle passengers come in all sizes, a concerted effort has been made to accommodate the extremes. As a result, it is often impossible or inconvenient for a motor vehicle passenger to use the angled toe board as a foot rest surface. In many instances, the passenger cannot comfortably reach the angled toe board. In other instances, the vehicle seat may need to be translated unnecessarily close to the instrument panel for the passenger's feet to comfortably reach the angled toe board.

A wide variety of amenities are provided in modern day motor vehicles to further occupant convenience and comfort. However, a need remains in the relevant art for comfortably supporting the feet of a passenger.

SUMMARY OF THE INVENTION

It is a general object of the present invention to provide a deployable foot rest for a motor vehicle.

In one form, the present invention provides a motor vehicle including an occupant compartment and a foot rest. The occupant compartment is partially defined by a floor. The foot rest is interconnected with the floor for movement between a first position and a second position. An upper surface of the foot rest is flush with the floor when the foot rest is in the second position. The upper surface extends above the floor when the foot rest is in the first position.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is a perspective view similar to FIG. 2, illustrating the deployable foot rest articulated to a stored position.

FIG. 4 is a cross-sectional view taken along the line 4—4 of FIG. 3.

DETAILED DESCRIPTION OF THE PREFERRED EMBODIMENT

Figure 1:
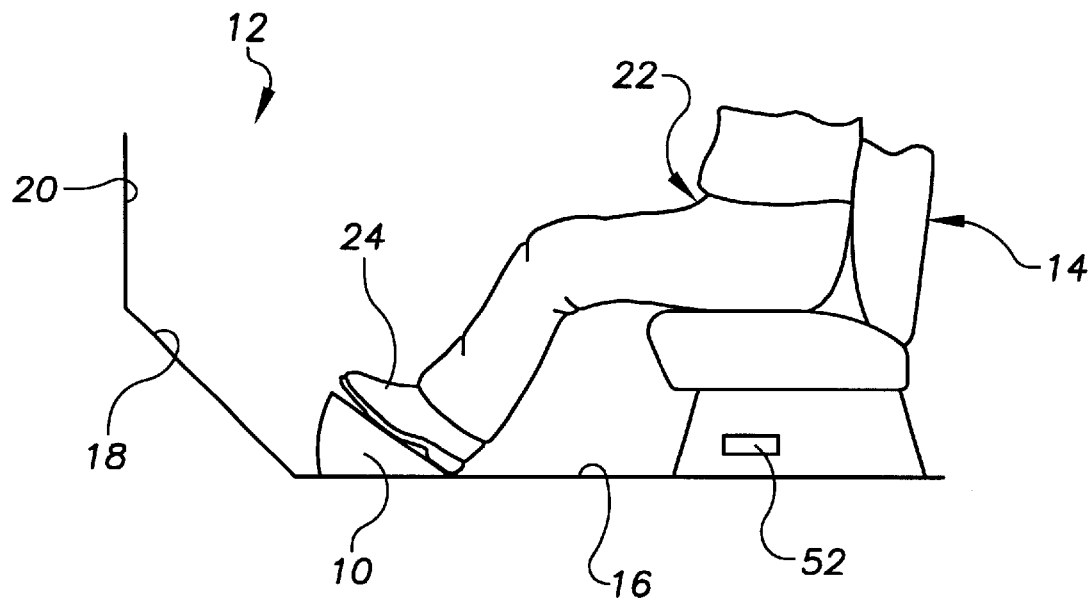
FIG. 1 is a simplified side view of a deployable foot rest constructed in accordance with the teachings of a preferred embodiment of the present invention, the foot rest shown operatively incorporated within an exemplary motor vehicle.

With initial reference to FIG. 1, a deployable foot rest constructed in accordance with the teachings of a preferred embodiment of the present invention is illustrated. The deployable foot rest is generally identified at reference numeral 10. The foot rest 10 is shown operatively incorporated within an exemplary motor vehicle 12. In this regard, it will be understood that the teachings of the present invention are not restricted to any particular vehicle.

In a conventional manner, FIG. 1 illustrates a front passenger-side seat 14 which is supported on and secured to a vehicle front 16. The vehicle floor 16 is flat and connects with an angled toe board 18 adjacent a fire wall 20. The foot rest 10 of the present invention is illustrated to extend from the floor 16 upwardly into the passenger compartment of the vehicle 12. The foot rest 10 is disposed in a longitudinal vehicle direction between the seat 14 and the angled toe board 18. A vehicle occupant 22 is partially illustrated seated on the seat 14 with his or her feet 24 supported by the foot rest 10. The location of the foot rest 10 encourages the passenger 22 to maintain a preferred travelling position (e.g., upright and against the seat back). While the environmental view of FIG. 1 illustrates the foot rest 10 associated with a front passenger seat 14, it will be understood that the teachings of the present invention are also applicable for use with other seating locations (not specifically shown) within a motor vehicle 12.

Figure 2:
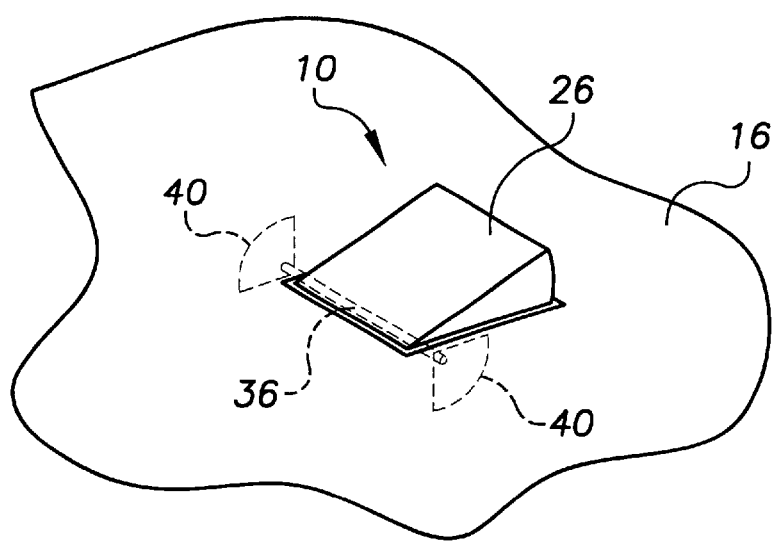
FIG. 2 is a perspective view of the deployable foot rest of FIG. 1 mounted in the motor vehicle, illustrating the deployable foot rest articulated to a deployed position.
Figure 5:
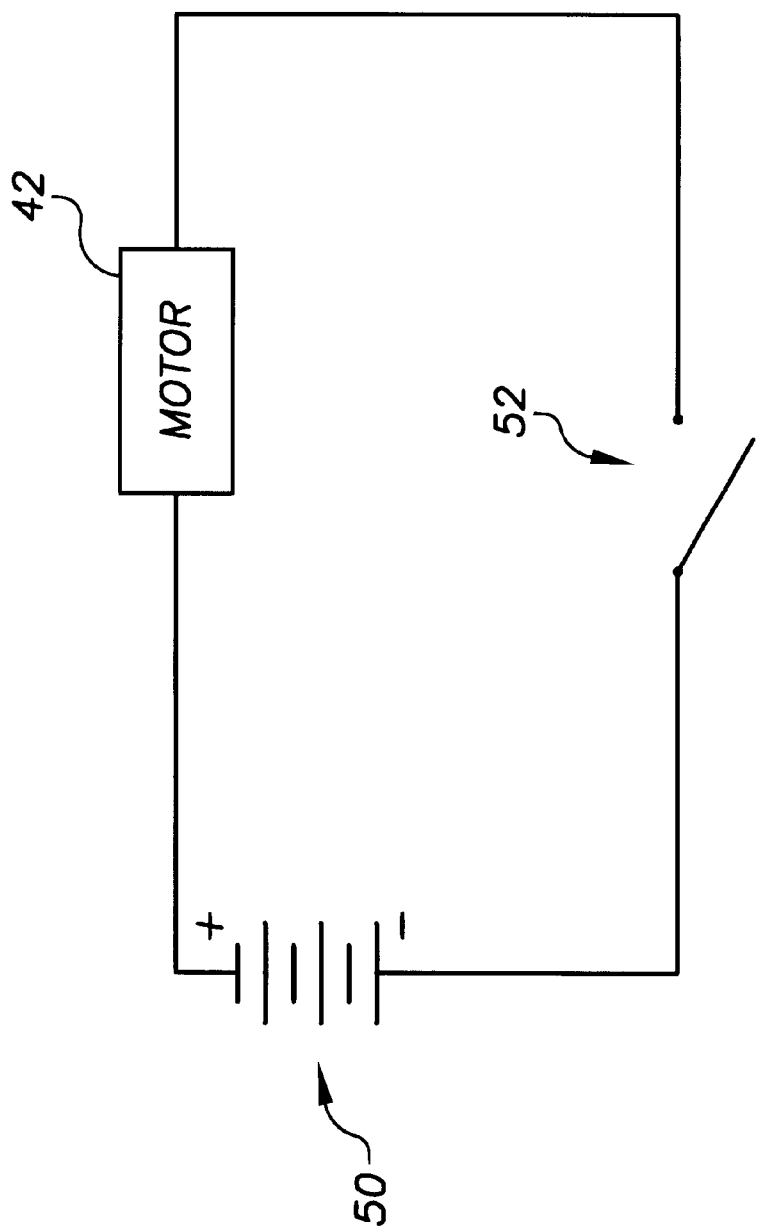
FIG. 5 is a schematic diagram illustrating interconnection between a vehicle battery, a drive motor for the deployable foot rest and a passenger switch for controlling the drive motor.

With continued reference to FIG. 1, additional reference to FIGS. 2–4, the construction and operation of the foot rest of the present invention will be further described. As will become apparent below, foot rest 10 is movable between a first position or stored position and a second position or deployed position. The foot rest 10 is shown in its stored position in FIGS. 3 and 4. The foot rest is shown in its deployed position in FIGS. 1 and 2. In the stored position, an upper surface 26 of the foot rest 10 is oriented flush with the floor 16. In this manner, the foot rest is positioned within an aperture 28 provided in the floor 16 and is sized to substantially fill the aperture 28. In the deployed position, the upper surface 26 of the foot rest 10 provides an inclined surface for supporting the feet 24 of the vehicle passenger 22.

As particularly shown in FIG. 4, the foot rest 10 is preferably triangular in shape. The upper surface 26 and a lower surface 30 are generally planar and converge at a rear edge 32 of the foot rest 10. A forward edge 34 of the foot rest 10 interconnects the diverging ends of the upper and lower surfaces 26 and 30 and is illustrated in the preferred embodiment to have a convex curvature.

In the preferred embodiment, the foot rest 10 is pivoted between the stored position and the deployed position.

In the embodiment illustrated, the foot rest 10 is pivotally interconnected to the floor 16 of the motor vehicle 12 through a pivot shaft 36. The pivot shaft 36 defines a laterally extending pivot axis and passes through an aperture 38 positioned approximate to the rear edge 32 of the foot rest 10. The pivot shaft 36 is connected to floor 16 through a pair of suitable bushings 40 (shown in simplified form in FIG. 2).

In the exemplary embodiment, the present invention further includes means for driving the foot rest 10 between the stored and deployed positions under a source of power. In one form, the means for driving the foot rest 10 under a source of power includes a motor 42 including an output shaft 44. The motor 42 is mounted to an underside 46 of the floor 16 in a suitable manner. The output shaft 44 carries a drive gear 48 having a plurality of teeth. The motor 42 is connected to a vehicle battery 50 and is controlled through a switch 52. As shown in FIG. 2, the switch is mounted on a side of the seat 14. Alternatively, it will be understood that the switch 52 may be mounted elsewhere in the passenger compartment of the motor vehicle 12 for the convenience of the occupant 22.

As illustrated, particularly in the cross-sectional view of FIG. 4, the concave side 34 of the foot rest 10 carries or alternatively is formed to include a plurality of teeth 54 which are in a constant mesh with the plurality of teeth of the drive gear 48. Rotation of the motor output shaft 44 in a first direction (e.g. clockwise as shown in FIG. 4) operates to move the foot rest 10 from the stored position to the deployed position. Conversely, rotation of the motor output shaft 44 in a second direction (e.g. counterclockwise as shown in FIG. 4) moves the foot rest from the deployed position to the stored position. The foot rest 10 may be incrementally positioned between the deployed and stored positions at any position selected by the vehicle passenger 22. In this manner, a rigid foot rest is provided for the passenger 22 that may be adjusted to a desired height.

Various other arrangements may be employed within the scope of the present invention for moving the foot rest 10 between the stored position and the deployed position under a source of power. Also, it will be clearly understood by those skilled in the art that manually operator arrangements may be employed within the scope of the present invention. For example, if the present invention may alternatively incorporate a push/push-type latching arrangement similar to the types used to deploy cupholders, ash trays and other devices. Such a latch conventionally functions to direct movement in a first direction in response to a first manual applied force and to permit movement in a second direction in response to a second manual applied force. In such an arrangement, a biasing mechanism would be employed to normally bias the foot rest 10 toward the second direction.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A motor vehicle comprising:
   an occupant compartment partially defined by a floor; and
   a foot rest including an arcuate surface carrying a plurality of teeth, interconnected with the floor for movement between a first position and a second position such that an upper surface of the foot rest is flush with the floor when the foot rest is in the first position and the upper surface extends above the floor when the foot rest is in the second position.

2. The motor vehicle of claim 1, wherein the foot rest is pivotally movable between the first position and the second position.

3. The motor vehicle of claim 1, further including a motor for driving the foot rest between the first position and the second position.

4. The motor vehicle of claim 3, further including a switch located in the passenger compartment for controlling the motor.

5. The motor vehicle of claim 3, further including a drive gear rotatably interconnected to the floor and being in meshing engagement with the plurality of teeth of the foot rest, the drive gear driven by the motor.

6. The motor vehicle of claim 2, wherein the foot rest is pivotally movable about a transversely extending pivot axis.

7. The motor vehicle of claim 6, wherein the transversely extending pivot axis is adjacent a rear edge of the foot rest member.

8. The motor vehicle of claim 1, wherein the foot rest may be incrementally positioned between the first position and the second position.

9. A motor vehicle comprising:
   an occupant compartment partially defined by a floor; and
   a rigid foot rest including a generally planar upper surface and a lower surface converging at a rear edge, the rear edge interconnected with the floor for pivotal movement about a transversely extending axis between a first position and a second position such that an upper surface of the foot rest is flush with the floor when the foot rest is in the first position and the upper surface extends above the floor at an inclined angle when the foot rest is in the second position, the rigid foot rest including a generally arcuate edge opposite the transversely extending axis carrying a plurality of teeth thereon.

10. The motor vehicle of claim 9, further including a motor for driving the foot rest between the first position and the second position.

11. The motor vehicle of claim 10, further including a switch located in the passenger compartment for controlling the motor.

12. The motor vehicle of claim 10, further including a drive gear rotatably interconnected to the floor and a plurality of teeth carried by the foot rest, the plurality of teeth being in meshing engagement with the drive gear, the drive gear driven by the motor.

13. The motor vehicle of claim 9, wherein the transversely extending pivot axis is adjacent a rear edge of the foot rest member.

14. The motor vehicle of claim 9, wherein the foot rest may be incrementally positioned between the first position and the second position.

\* \* \* \* \*